United States Patent [19]

Nishikawa et al.

[11] Patent Number: 4,819,498
[45] Date of Patent: Apr. 11, 1989

[54] TILT STEERING APPARATUS FOR VEHICLES

[75] Inventors: Masumi Nishikawa, Toyoake; Masanobu Ishikawa; Hiroshi Watanabe, both of Nagoya, Japan

[73] Assignee: Aisin Seiki Kabushiki Kaisha, Japan

[21] Appl. No.: 16,798

[22] Filed: Feb. 20, 1987

[30] Foreign Application Priority Data

Feb. 22, 1986 [JP] Japan .................. 61-037643

[51] Int. Cl.$^4$ .............................. B62D 1/18
[52] U.S. Cl. ........................ 74/493; 74/540; 280/775
[58] Field of Search ............ 74/493, 540; 280/775

[56] References Cited

U.S. PATENT DOCUMENTS

| | | | |
|---|---|---|---|
| 3,216,521 | 11/1965 | Ulrich | 74/493 X |
| 4,102,218 | 7/1978 | Naka et al. | 74/493 |
| 4,463,626 | 8/1984 | Kazaoka et al. | 74/493 |
| 4,502,730 | 3/1985 | Kazaoka et al. | 297/366 |
| 4,530,254 | 7/1985 | Toyoda et al. | 74/493 |
| 4,594,909 | 6/1986 | Yamaguchi | 74/493 |
| 4,633,732 | 1/1987 | Nishikawa et al. | 74/493 |
| 4,750,379 | 6/1988 | Nishikawa et al. | 74/540 X |

FOREIGN PATENT DOCUMENTS 57-155156  9/1982  Japan .
58-85756   5/1983  Japan .................. 74/493

Primary Examiner—Allan D. Herrmann
Attorney, Agent, or Firm—Finnegan, Henderson, Farabow, Garrett, & Dunner

[57] ABSTRACT

A tilt steering apparatus for vehicles has a fixed bracket member fixed on a vehicle body and a rotatable bracket member pivoted on the fixed bracket member. A ratchet member and a pawl are disposed on the opposite bracket members. A lever for disengaging the pawl from the ratchet is rotatably disposed around the pivoting point between the fixed bracket and the rotatable bracket at one end thereof.

10 Claims, 6 Drawing Sheets ated on 4,819,498

TILT STEERING APPARATUS FOR VEHICLES

BACKGROUND OF THE INVENTION

1. Field of the Invention

The invention relates to a tilt steering apparatus for vehicles.

2. Description of the Prior Art

A conventional tilt steering apparatus for vehicles, for example as shown in Japanese Koukai U.S. Pat. No. 57-155156, fundamentally comprises a fixed bracket fixed on a vehicle body, a rotatable bracket pivotably mounted on the fixed bracket and supporting a steering wheel structure, a pawl mounted on one of the fixed bracket and the rotatable bracket and being engageable with and disengageable from a ratchet formed on the other of the fixed bracket and the rotatable bracket so as to secure the rotatable bracket on the fixed bracket, a manual operating lever pivotably mounted on the other of the fixed bracket and the rotatable bracket and operatively connected with the pawl through a cam mechanism provided between the pawl and the manual operating lever so as to engage between the pawl and the ratchet and disengage the pawl from the ratchet. Therefore, by operating the manual operating lever, the pawl is disengaged from the ratchet and the rotatable bracket becomes rotatable or tiltable.

In the conventional tilt steering apparatus, however, the manual operating lever projects from a steering column. Therefore, the outer appearance thereof is unappealing. Further, the manual operation of the manual operating lever is very troublesome.

Besides, the cam mechanism is used between the manual operating lever and the pawl. Therefore, when the ratio of the length between the cam portion and the pivoting portion to the length between the grip portion and the pivoting portion in the manual operating lever is large, the grip portion and the pivoting portion in the manual operating lever moves within the small area but the cam mechanism becomes large. While when the above ratio is small, the cam mechanism becomes small but the grip portion moving area becomes large. Also, at this point, the tilt steering apparatus becomes large.

SUMMARY OF THE INVENTION

The primary object of the invention is to provide an improved tilt steering apparatus for vehicles in which the above disadvantages have been obviated.

Another object of the invention is to provide a tilt steering apparatus for vehicles in which the structure around the steering column is simple or small. A still further object of the invention is to provide a tilt steering apparatus for vehicles which is tiltable in accordance with the operation of a rotary actuator.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

These objects are realized by a tilt steering apparatus for vehicles comprising a lever for disengaging the pawl from the ratchet rotatably disposed around the pivoting point between the fixed bracket and the rotatable bracket at one end thereof, and a rotary actuator mounted on the other of the fixed bracket and the rotatable bracket, the rotary actuator operatively connected to the lever at the other end thereof.

By driving the rotary actuator, the lever rotates around the pivoting point between both brackets so that the pawl is disengaged from the ratchet. This result means that the rotatable bracket becomes rotatable and the steering wheel is adjustable at some desired position for the driver and is movable at a tilt away position.

DESCRIPTION OF THE PREFERRED EMBODIMENT

Figure 1:
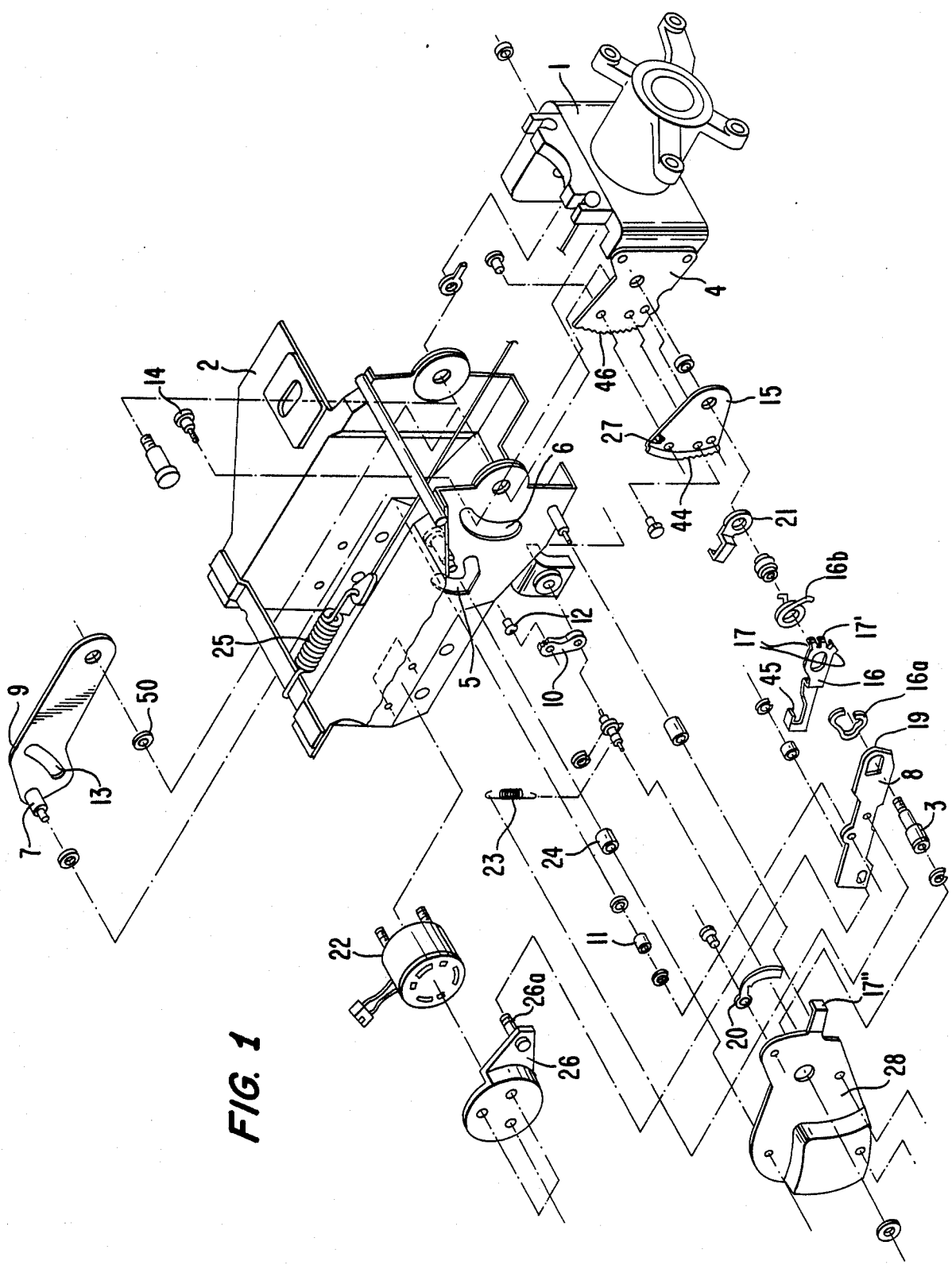
FIG. 1 is a perspective view showing an embodiment according to the invention in disassembled state.
Figure 2:
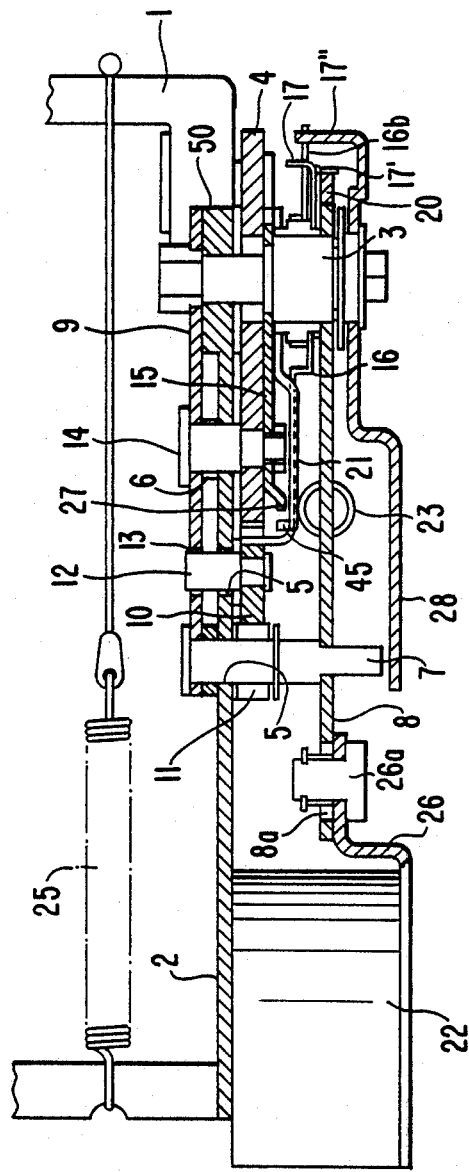
FIG. 2 is a cross-sectional view showing the embodiment of FIG. 1.
Figure 3:
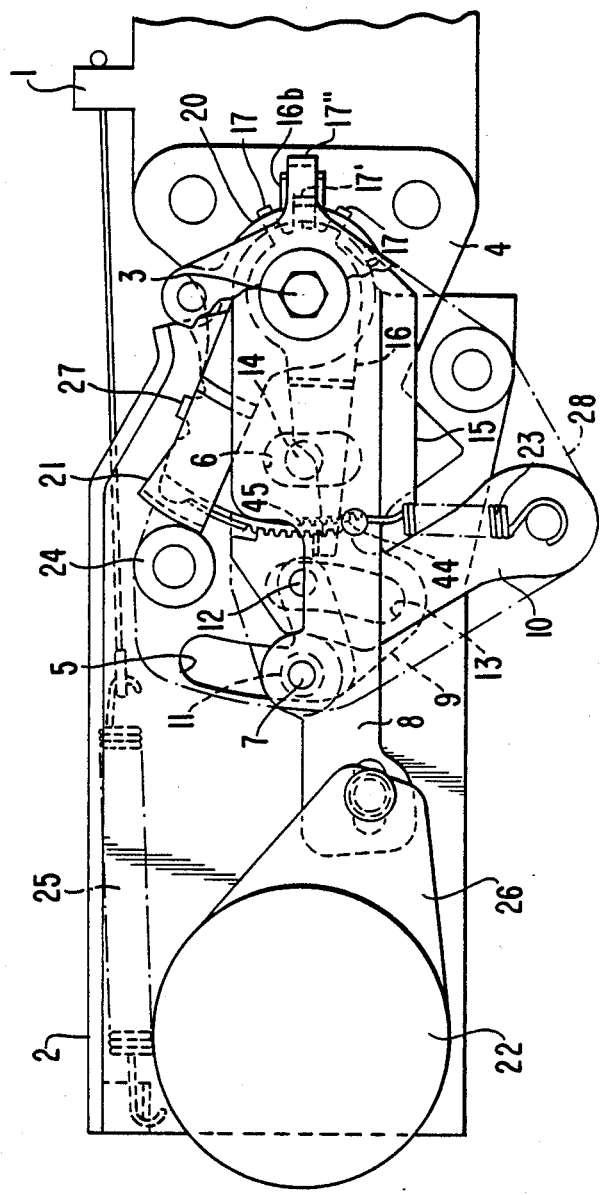
FIG. 3 is a side view showing the embodiment of FIG. 1 in the fixed state.

Referring to FIGS. 1 to 3, a rotatable bracket 1 supporting a steering wheel structure (not shown) is pivoted on a fixed bracket 2 secured on a vehicle body (not shown) through a first pivoting pin 3.

In the steering wheel structure, a first steering shaft is connected to a second steering shaft through a tilt pin. A steering wheel is fixed on the first steering shaft and a steering gear engine is connected to the second steering shaft. The first steering shaft and the second steering shaft are respectively rotatably supported on the rotatable bracket 1 and the fixed bracket 2. A tilt pin and the first pivoting pin 3 are co-axially arranged.

On the rotatable bracket 1, a ratchet plate 4 is fixedly mounted and the ratchet plate 4 has a plurality of teeth 46 formed around the first pivoting pin 3.

The fixed bracket 2 has an L-shaped slot 5 and an arch shaped slot 6. A second pin 7, which is inserted into the L-shaped slot 5, is connected to a first lever 8 and a second lever 9 at both ends thereof. The second pin 7 further supports a spacer 11 or collar, which can contact with a pawl 10 pivotably mounted on the fixed bracket 2. Both lever 8, 9 are respectively rotatably supported around the first pivoting pin 3. A bearing member 50 is arranged around pin 3 between fixed bracket 2 and second lever 9. A third pin 12 is mounted on the pawl 10 is engaged with the cam slot 13 formed in the second lever 9 so that the pawl 10 is engageable with the disengageable from the teeth of the ratchet plate 4 in accordance with the movement of the second lever 9. A fourth pin 14 is mounted on the ratchet plate 4 and a memory plate 15 and is inserted into the arch-shaped slot 6, whereby the memory plate 15 turns integrally with the ratchet plate 4 around the first pin 3. A plurality of teeth 44, which are formed around the first pin 3 on the memory plate 15, are engageable with a pawl of a memory lock plate 16. The memory lock plate 16 has a projecting portion 17' and a pair of abutting portions 17 at a right end thereof.

On the right side end of the lever 8, a cam surface 19 is formed and faced to a cam release 20. Also, a tilt pawl hook 21 is rotatably mounted around the first pin 3.

The first lever 8 is rotatably connected to the rotary actuator 22 fixed on the fixed bracket 2. Further, a spring 23 is disposed between the pawl 10 and the first lever 8 so as to bias the first lever 8 in the counter-clockwise direction around the first pin 3. The tilt pawl hook 21 contacts with a stopper 24 at the tip end thereof. A spring 25 is disposed between the rotatable bracket 1 and the fixed bracket 2 so as to bias the rotatable bracket 1 and tilt the steering wheel.

Figure 3A:
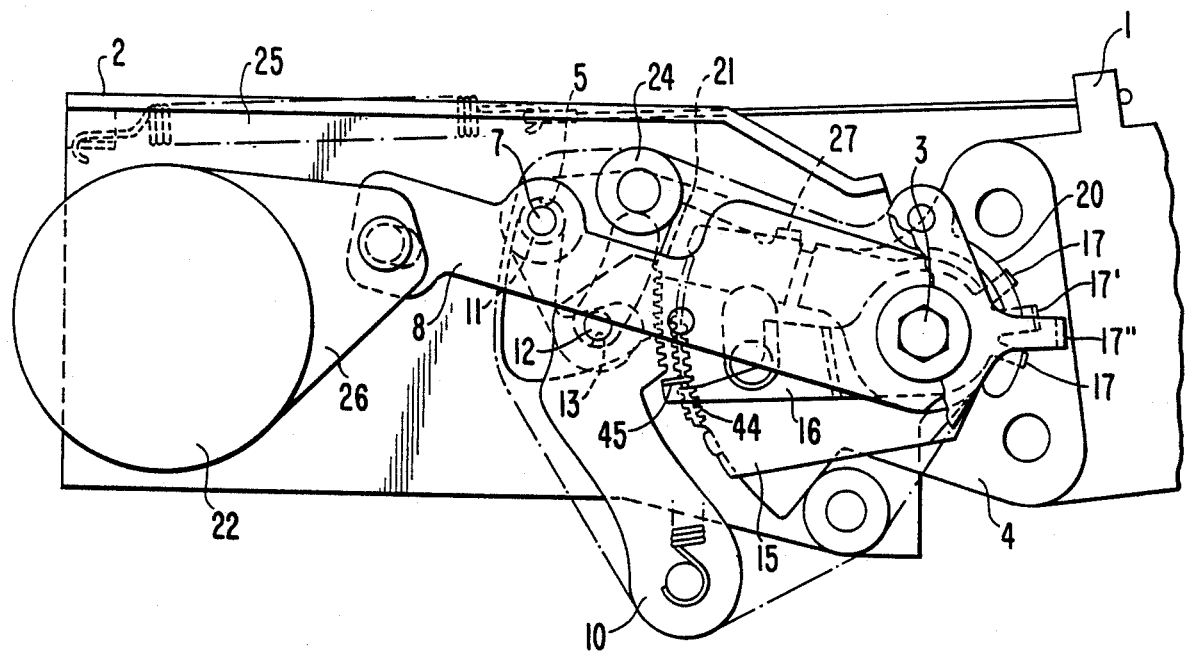
FIG. 3A is a side view showing the embodiment in transition from the fixed state of FIG. 3 to the tilt away state of FIG. 4.

From the fixed state shown in FIG. 3 and as shown in FIG. 3A by driving the rotary actuator 22, an arm 26 of the rotary actuator 22 rotates in the counter-clockwise direction. Pin 26 on arm 26 moves within slot 8a on the first lever 8, causing, the first lever 8 to turn around the first pin 3 in the clockwise direction. At this time, the second pin 7 moves along the L-shaped slot 5 with the first lever 8. Thereby, the second lever 9 also turns around the first pin 3 in co-operation with the first lever 8. The spacer 11 is released from contact with the pawl 10 and the pawl 10 is disengaged from the ratchet plate 4 by the movement of the third pin 12 along the slot 13.

Further, by the rotation of the first lever 8 around the first pin 3, the cam surface 19 thereof raises the cam release 20 so as to contact the cam release 20 with the projection 17 of the memory lock plate 16. Thereby, the memory lock plate 16 moves towards the right direction and the teeth 45 thereof engage with the teeth 44 of the memory plate 15 so as to memorize the original fixed position as shown in FIG. 3. In accordance with the rotation of the rotatable bracket 1 in the counter-clockwise direction around the first pin 3 by the spring 25, a bent portion 27 formed on the upper side of the memory plate 15 is engaged with the upper side of the tilt pawl hook 21 so as to move the tilt pawl hook 21 in the downward direction. This downward movement of the tilt pawl hook 21 causes the tilt pawl hook 21 to engage with a stepped portion of the pawl 10 so that the disengagement state between the pawl 10 and the ratchet plate 4 is maintained as shown in FIG. 4. Namely, the steering wheel moves to the tilt away position. Numeral 28 designates a cover.

Figure 4A:
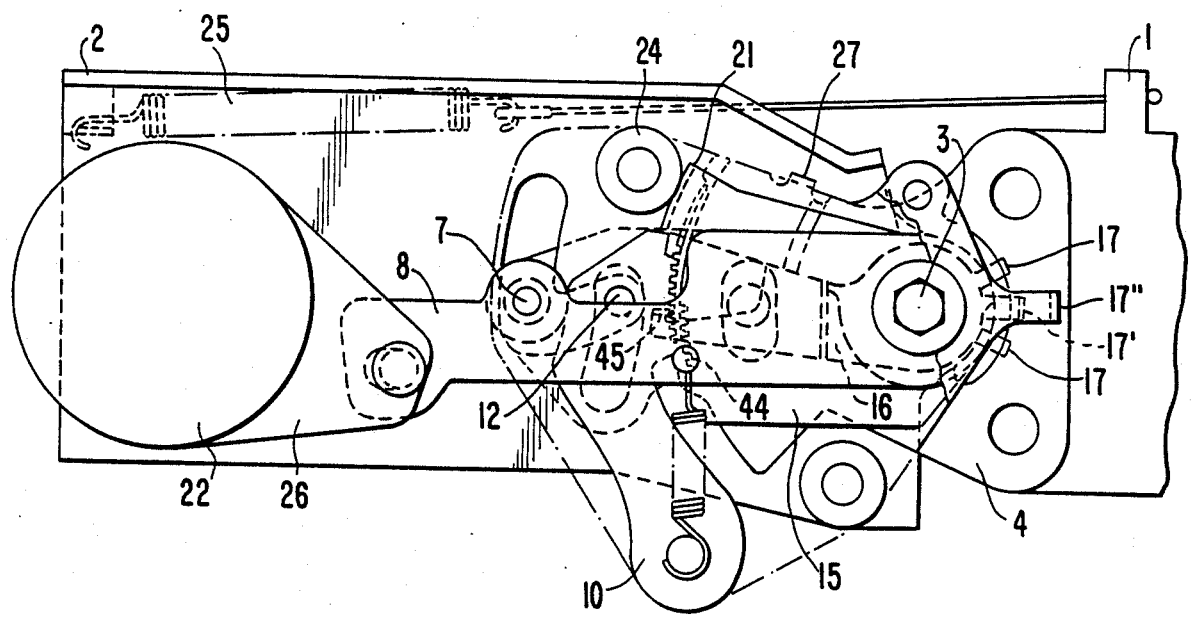
FIG. 4A is a side view showing the embodiment in transition from the tilt away state of FIG. 4 to the fixed state of FIG. 3.
Figure 4:
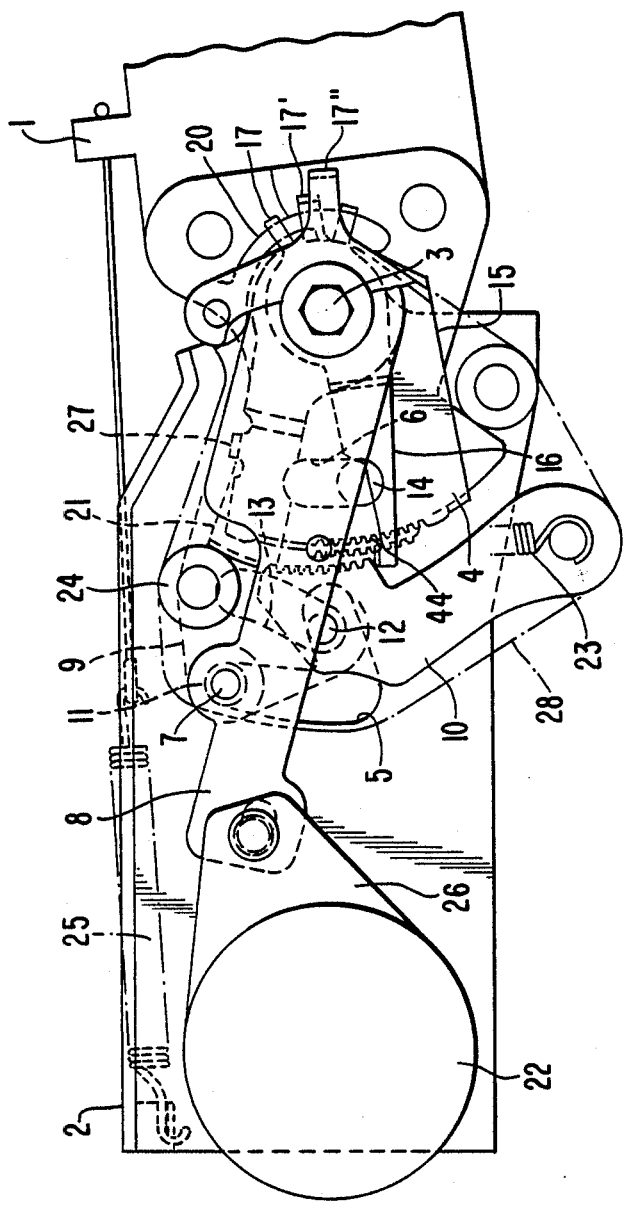
FIG. 4 is a side view showing the embodiment of FIG. 1 in the tilt away state.

From the tilt away position shown in FIG. 4, and as shown in FIG. 4A by manually lifting down the rotatable bracket 1, the bent portion 27 of the memory plate 15 is separated from the tilt pawl hook 21 and the memory plate 15 moves in the upward direction around the first pin 3 with the ratchet plate 4. At the same time, the memory lock plate 16, which engages with the memory plate 15, also rotates around the first pin 3 with the ratchet plate 4. At the same time, the memory lock plate 16, which engages with the memory plate 15, also rotates around the first pin 3 in the clockwise-direction. The upper side of the memory lock plate 16 abuts against the lower side of the tilt pawl hook 21, whereby the tilt pawl hook 21 is disengaged from the pawl 10. The first lever 8 moves in the downward direction around the first pin 3 by the spring 23. The second lever 9 connected to the first lever 8 through the second pin 7 also moves along the L-shaped slot 5 and the pawl 10 moves along the slot 13 formed in the second lever 9 by the pin 12 engaged therein so that the pawl 10 again engages with the teeth of the ratchet plate 4. By a memory lock release spring 16a, which is mounted around the first pin 3 and biases the memory lock plate 16 in the left direction, the memory lock plate 16 moves in the left direction and is disengaged from the memory plate 15. The steering wheel returns to the memorized original fixed position as shown in FIG. 3.

By driving the rotary actuator 22 for releasing the pawl 10 from the teeth of the ratchet plate 4, the steering wheel manually moves at the desired position.

After that, by stopping the rotary actuator 22, the pawl 10 again engages with the teeth of the ratchet plate 4, whereby the steering wheel fixed position is adjusted. Both ends of a torsion 16b around the first pin 3 is engaged with a bent portion 17' of the memory lock plate 16 and another bent portion 17" of the cover 28, respectively. Therefore, the memory lock 16 always positions at the same positioned as the rotatable bracket 1 in the fixed state.

Figure 6:
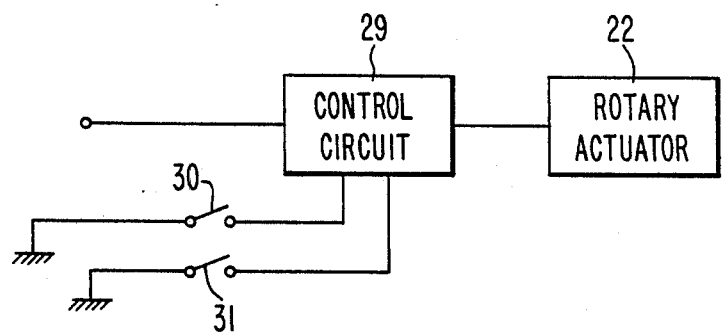
FIG. 6 is a control circuit for the rotary actuator used in the embodiment of FIG. 1.

The rotary actuator 22, as shown in FIG. 6, is electrically connected to a control circuit 29 and the control circuit 29 is electrically connected to an unlock warning switch 30 and a manual switch 31. The unlock warning switch 30, which is disposed in an ignition switch (not shown), is normally open but closes when an engine key is inserted into the ignition switch. This unlock warning switch 30 is used in the door unlock warning system. The manual switch 31 is normally opened. The control circuit 29, in accordance with the manual switch 31 operation (closed state), drives the rotary actuator 22. The manual switch 31 is mainly used when the steering wheel is adjusted at the desired position. By the key taken off the ignition switch, the unlock warning switch 30 is opened and the control circuit 29 drives the rotary actuator 22. Therefore, when the driver gets out, the steering wheel always moves in the tilt away position.

Particularly, by the combination with a timer circuit and the unlock warning switch 30, the rotary actuator 22 is driven during a predetermined constant time after the unlock warning switch 30 operates so that the steering wheel is certain to move to the tilt away position. Further, the rotary actuator 22 automatically stops.

Figure 7:
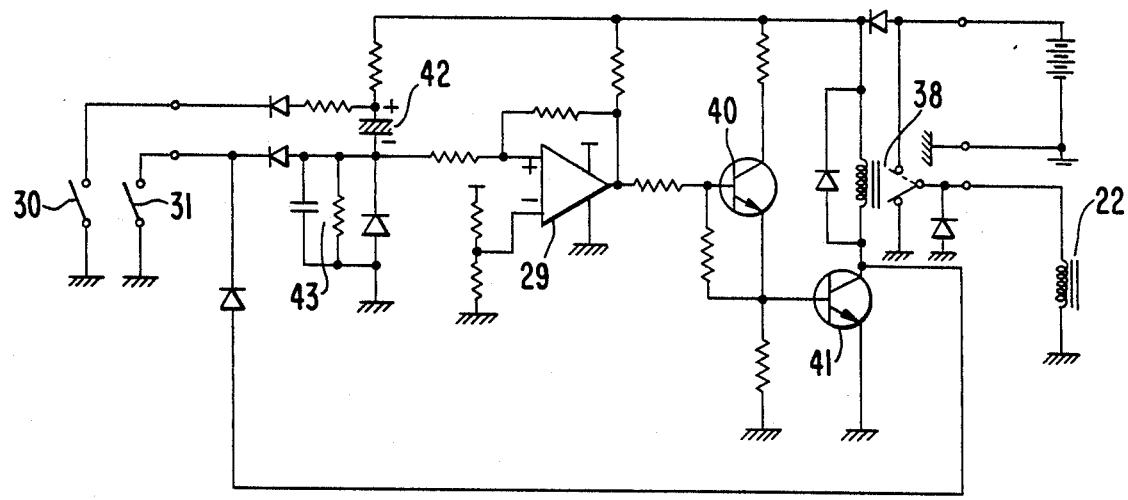
FIG. 7 is a schematic of a real control circuit for the rotary actuator.

The real control circuit 29 is shown in FIG. 7. In the circuit, in accordance with the closed operation of the manual switch 31, a relay 38 operates so that the rotary actuator 22 is driven. Whereas, if the unlock warning switch 30 is opened, voltage level of a condensor 42 increases. Therefore, output of a comparator 29 becomes in high-state and both transistors 40, 41 becomes in one state. Thereby, the relay 38 becomes to operate. High level of the condensor 42 continues during term mainly determined by the capacitance of the condensor 42 and the resistance of the resistor 43. After the term, since the level of the condensor 42 becomes lower, the output level of the comparator 29 changes so that the relay 38 switches off and the rotary 22 automatically stops.

Figure 5:
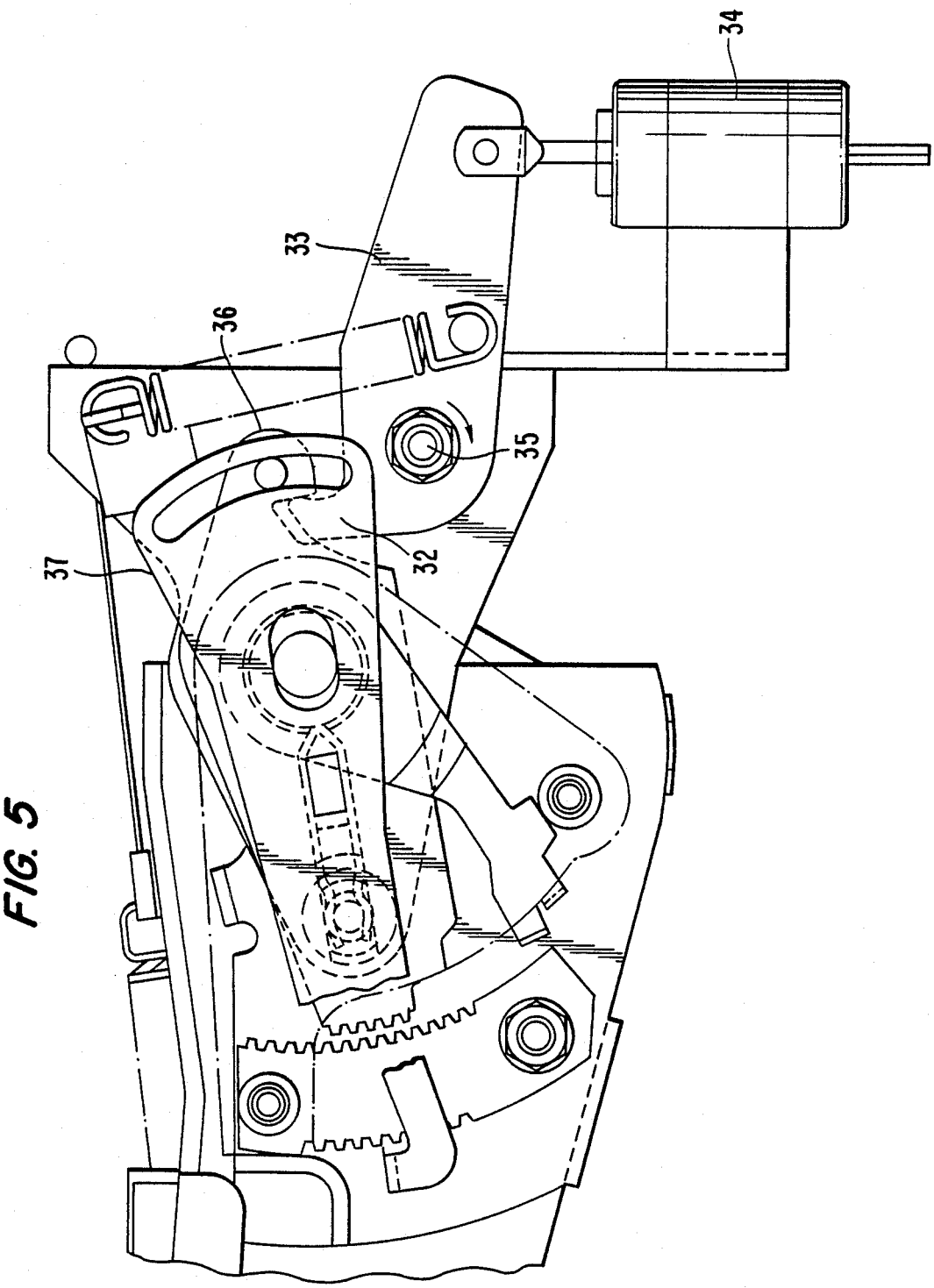
FIG. 5 is a side view showing another tilt steering apparatus for vehicles having a push pull type actuator so as to clarify the merits of the embodiment having a rotary actuator.

As shown in FIG. 5, in a conventional tilt steering apparatus, cam mechanism 32 is disposed between a lever 33 and a pawl 37. Therefore, a push-pull type actuator 34 should be used so as to rotate the lever 33. As compared with the embodiment shown in FIGS. 1 to 4, the tilt steering apparatus of FIG. 5 needs a large space for the rotatable bracket 1. However, the embodiment according to the invention shown in FIGS. 1-4 does not need a large space for the rotatable bracket 1. Further, in the modified conventional tilt steering shown in FIG. 5, when a small actuator 34 is used, long lever 33 is required so as to surely move the lever 33 by the small actuator 34. Thus, the rotatable bracket 1 or the steering column becomes larger. But, in the embodiment according to the invention, since the first and second levers 8, 9 are arranged along the steering column, the steering column can easily house even long levers 8, 9 therein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A tilt steering apparatus for vehicles comprising;
   a fixed bracket member fixed on a vehicle body;
   a rotatable bracket member pivotally mounted about a pivot axis on said fixed bracket member;
   a ratchet member disposed on one side of one of said rotatable bracket member and said fixed bracket member, said ratchet member having a teeth portion formed around said pivot axis;
   a pawl member pivotally mounted on the other of said rotatable bracket member and said fixed bracket member, said pawl member being engageable with said teeth portion of said ratchet member,
   a rotary actuator mounted on said other bracket member;
   a lever member rotatably mounted around said pivot axis between said rotatable bracket member and said fixed bracket member at one end thereof, said lever member operatively connected to said rotary actuator at the other end thereof;
   means for operatively connecting said lever member to said pawl member so as to disengage said pawl member from said teeth portion of said ratchet member, and
   means for memorizing an original position of said rotatable bracket member before said pawl member is disengaged from said teeth of said ratchet member.

2. A tilt steering apparatus for vehicles according to claim 1, wherein said memorizing means comprises:
   a memory lock member rotatably mounted on said pivot axis, said memory lock member engageable with said teeth of said ratchet member so as to memorize the original fixed position of said rotatable bracket, and
   means for operatively connecting said lever member to said memory lock member so as to engage said memory lock member with said teeth of said ratchet member when said pawl member is disengaged therefrom.

3. A tilt steering apparatus for vehicles according to claim 2, wherein said memorizing means further comprises:
   a tilt pawl member rotatably mounted around said pivot axis;
   an engaging member disposed between said tilt pawl member and said ratchet member;
   whereby said tilt pawl member moves with said ratchet member so as to engage said pawl member and maintain said pawl member in the disengaged state when said rotatable bracket member moves to the tilt away position; and
   said memory lock member abuts against said tilt pawl member so as to disengage said tilt pawl member from said pawl member when said rotatable bracket member returns to its original fixed position.

4. A tilt steering apparatus for vehicles according to claim 1, further comprising:
   a spring disposed between said rotatable bracket member and said fixed bracket member so as to bias said rotatable bracket member towards the tilt away position.

5. A tilt steering apparatus for vehicles according to claim 1, further comprising:
   a control means for driving said rotary actuator, said control means including a manual switch member so as to drive said rotary actuator in accordance with the operation of said manual switch member.

6. A tilt steering apparatus for vehicles according to claim 1, further comprising:
   a control means for driving said rotary actuator, said control means including a switch member operated in accordance with the entrance and exit of the vehicle passenger.

7. A tilt steering apparatus for vehicles according to claim 6, wherein said control means has a timer means operated by the operation of said switch member for driving said rotary actuator for a predetermined time so as to disengage said pawl member from said teeth of said ratchet member.

8. A tilt steering apparatus for vehicles comprising;
   a fixed bracket member fixed on a vehicle body;
   a rotatable bracket member pivotally mounted about a pivot axis on said fixed bracket member;
   a ratchet member disposed on one side of one of said rotatable bracket member and said fixed bracket member, said ratchet member having a teeth portion formed around said pivot axis;
   a pawl member pivotally mounted on the other of said rotatable bracket member and said fixed bracket member, said pawl member being engageable with said teeth portion of said ratchet member;
   a rotary actuator mounted on said other bracket member;
   a lever member including a first lever and a second lever parallelly arranged and rotatably mounted around said pivot axis between said rotatable bracket member and said fixed bracket member at one end thereof, said first lever member being operatively connected to said rotary actuator at the other end thereof and said second lever being operatively connected to said pawl member at the other end thereof;
   means for operatively connecting said first and second levers to said pawl member so as to disengage said pawl member from said teeth portion of said ratchet member; and
   means for memorizing an original position of said rotatable bracket member before said pawl member is disengaged from said teeth of said ratchet member.

9. A tilt steering apparatus for vehicles according to claim 8, wherein said first and second levers are connected through a pin, said pin abuts against said pawl member so as to engage said pawl member with said teeth of said ratchet member.

10. A tilt steering apparatus for vehicles according to claim 9, wherein said fixed bracket member is disposed between said first and second levers, and wherein said pin disposed between said first and second levers is extended into a slot formed in said fixed bracket member.

* * * * *